United States Patent Office 3,565,883
Patented Feb. 23, 1971

3,565,883
DISAZO DYES DERIVED FROM PYRIDINES
Peter Dimroth, Ludwigshafen, Germany, assignor to Badische Anilin- & Soda-Fabrik Aktiengesellschaft, Ludwigshafen, Germany
No Drawing. Filed Feb. 28, 1969, Ser. No. 803,424
Claims priority, application Germany, Mar. 1, 1968,
P 17 19 061.3
Int. Cl. C09b *33/12*
U.S. Cl. 260—156                    2 Claims

ABSTRACT OF THE DISCLOSURE

Disazo dyes derived from a benzidine tetrazo component and 2,6 - dihydroxy - 4 - methylpyridine - 3 - nitrile as coupling component and their use as pigments.

---

The invention relates to new disazo dyes having the general Formula I:

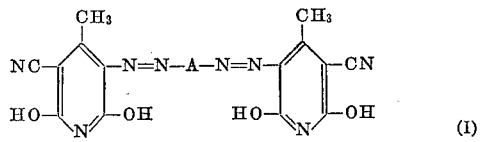

where A denotes a benzidine radical which is unsubstituted or bears the substituents specified below and is devoid of carboxyl and sulfonic acid groups, to a process for the production of such dyes and their use as pigments.

Examples of substituents for the radical A are chlorine, bromine, alkyl, alkoxy and carbalkoxy.

The new dyes may for example have the general Formula Ia:

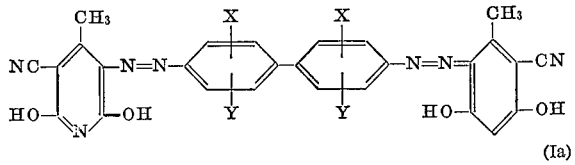

where X denotes a hydrogen, chlorine or bromine atom or a methyl, ethyl, methoxy, ethoxy, carbomethoxy or carboethoxy group and Y denotes a hydrogen or chlorine atom.

Dyes in which the benzidine radical is substituted and particularly bears as substituents X and Y chlorine, methyl, ethyl, methoxy or ethoxy are preferred; of these those have only one substituent in the 3- and 3'-positions are preferred. Radical A which is contained in the dyes according to this invention may be for example the radical of: benzidine, 3,3'-dichlorobenzidine, 2,2'-dichlorobenzidine, 3,3'-dibromobenzidine, 3,3'-dimethoxybenzidine, 3,3' - dimethylbenzidine, 2,2' - dimethylbenzidine, 2,2',3,3' - tetrachlorobenzidine, 3,3' - dicarbomethoxybenzidine and 3,3'-dinitrobenzidine.

Benzidines bearing chlorine, methyl or methoxy as substituents in the 3,3'-positions are particularly preferred because they give particularly valuable dyes having the general Formula Ib:

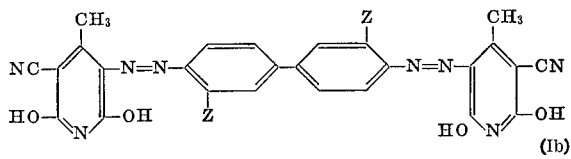

where Z denotes a chlorine atom or a methoxy or methyl group.

The new dyes may be obtained for example by tetrazotization of benzidines having the general Formula II:

$$H_2N-A-NH_2 \quad (II)$$

where A has the meanings given for Formula I followed by coupling with 2,6-dihydroxy-4-methylpyridine-3-nitrile. Tetrazotization and coupling are preferably carried out in aqueous solution but is may be advantageous to add solvents, dispersing agents or emulsifiers.

The new dyes are suitable as pigments. Depending on the substituents on the benzidine radical, orange to blue compounds are obtained. The properties of the pigments, particularly the fine state of subdivision, are dependent on the methods of finishing and preparation and may be influenced by measures known from the literature such as swelling, heating in solvents or grinding with agents and thus adapted to the particular application.

The new pigments may be used for example in printing inks or surface coatings or for mass coloring plastics.

Examples of surface coatings are those which contain acrylates, melamine resins, urea-formaldehyde condensation products, alkyd resins or varnish. Printing inks made with the new pigments may be used for example in book or offset printing or in textile printing.

Examples of plastics which may be colored with the compounds having the Formula I are polyvinyl chloride, polystyrene and rubber.

Prints, colorations or coatings prepared with the new strongly coloured and brilliant pigments have good fastnesses to light, oil, overcoating, overspraying and migration.

The following examples illustrate the invention. Statements in the following examples as to parts and percentages relate to weight.

EXAMPLE 1

46 parts of benzidine is diazotized in water in the usual way. 75 parts of 2,6-dihydroxy-4-methylpyridine-3-nitrile is added and the whole is slowly neutralized with 5% caustic soda solution and stirred for twelve hours. The deposited dye is then suction filtered, washed with water and suspended again in 2000 parts of water. The dispersed is boiled for four hours while stirring and filtered while hot. Heating is then repeated with 1500 parts of methanol, followed by suction filtration, washing and drying. 120 parts of a violet blue pigment powder is obtained.

EXAMPLES 2–7

The procedures of Example 1 is adopted but 0.25 mole of the substituted benzidines indicated in the table is used instead of benzidine. Pigments are obtained in the amounts specified (in parts under the heading "Yield") and in the shades indicated (under the heading "Shade"). The first column in the table gives the number of the example.

TABLE

| | Benzidine | Yield | Shade |
|---|---|---|---|
| 2 | 3,3'-dichlorobenzidine | 135 | Red violet. |
| 3 | 2,2'-dichlorobenzidine | 130 | Orange. |
| 4 | 3,3'-dimethoxybenzidine | 125 | Blue. |
| 5 | 3,3-dimethylbenzidine | 120 | Violet. |
| 6 | 2,2'-dimethylbenzidine | 120 | Orange. |
| 7 | 2,2',3,3'-tetracholrobenzidine | 145 | Do. |

Use in printing inks: 1 part of the pigment prepared according to Example 1 is ground with 10 parts of linseed oil varnish on a three roll mill. The printing ink prepared in this way, when used in book printing, gives blue violet prints having excellent brilliance and good light fastness. Similar results are obtained when the pigments obtained in Examples 2 to 7 are used, the shades indicated in the table then being obtained.

Use in baking enamels: 95 parts of baking enamel mixture (consisting of 67 parts of coconut oil resin, 17 parts of urea-formaldehyde resin and 16 parts of ethylene glycol) is ground with 8 parts of the pigment described in Example 1 in a cone mill. The blue violet enamel obtained is applied to sheet metal, cardboard or aluminum foil, and baked. Blue violet colorations having excellent fastness to overspraying are obtained. Similar results are obtained when the pigments prepared according to Examples 2-7 are used, the colors indicated in the table being obtained.

Use in plastics: A mixture of 70 parts of polyvinyl chloride, 30 parts of diisooctyl phthalate and 1 part of titanium dioxide is colored in the usual manner with 0.5 part of the pigment obtained according to Example 1 in a set of mixing rolls heated to 160° C. A blue violet composition is obtained from which, for example, sheeting, film or sections may be prepared. The color is distinguished by high brilliance and good fastness to plasticizers. Similar results are obtained when the pigments described in Examples 2-7 are used.

We claim:
1. A disazo dye of the formula:

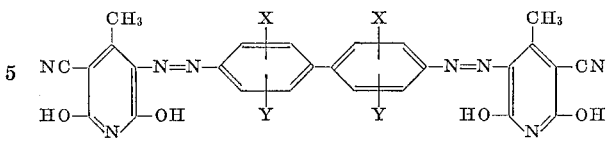

where X is hydrogen, chlorine, bromine, methyl, ethyl, methoxy, ethoxy, carbomethoxy, or carboethoxy and Y is hydrogen or chlorine.

2. A dye according to claim 1 of the formula:

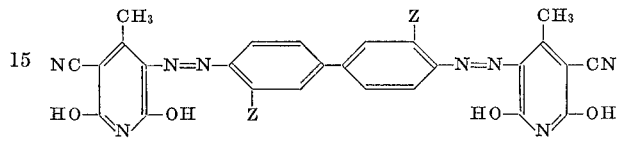

where Z is chlorine, methyl or methoxy.

References Cited
UNITED STATES PATENTS
3,487,066   12/1969   Ritter et al. _____ 260—156

JOSEPH P. BRUST, Primary Examiner

D. M. PAPUGA, Assistant Examiner

U.S. Cl. X.R.

106—22; 260—37

UNITED STATES PATENT OFFICE
CERTIFICATE OF CORRECTION

Patent No. 3,565,883   Dated February 23, 1971

Inventor(s) Peter Dimroth

It is certified that error appears in the above-identified patent and that said Letters Patent are hereby corrected as shown below:

Column 1, Formula Ia, that portion of the formula reading " 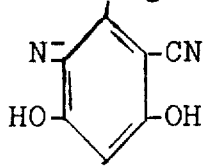 " should read -- 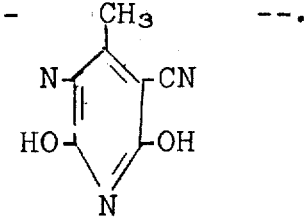 --.

Column 1, Formula Ib, that portion of the formula reading
"  \\    "    should read  --   /\\   --.
HO  N                          HO  N Signed and sealed this 20th day of July 1971.

(SEAL)
Attest:

EDWARD M. FLETCHER, JR.   WILLIAM E. SCHUYLER
Attesting Officer          Commissioner of Pat